United States Patent
Bhardwaj et al.

(10) Patent No.: US 11,636,409 B2
(45) Date of Patent: Apr. 25, 2023

(54) REAL-TIME RECOMMENDATION SYSTEMS AND METHODS

(71) Applicant: OLX Global B.V., Hoofddorp (NL)

(72) Inventors: Bhagirath Bhardwaj, Haryana (IN); Gaurav Bansal, Haryana (IN); Md Tanweer Alam, Haryana (IN)

(73) Assignee: OLX GLOBAL B.V., Hoofddorp (NL)

( * ) Notice: Subject to any disclaimer, the term of this patent is extended or adjusted under 35 U.S.C. 154(b) by 511 days.

(21) Appl. No.: 16/526,289

(22) Filed: Jul. 30, 2019

(65) Prior Publication Data

US 2021/0035046 A1    Feb. 4, 2021

(51) Int. Cl.
*G06Q 10/0631*    (2023.01)
*G06F 16/9538*    (2019.01)
*G06N 5/04*    (2023.01)

(52) U.S. Cl.
CPC .    *G06Q 10/063112* (2013.01); *G06F 16/9538* (2019.01); *G06N 5/04* (2013.01)

(58) Field of Classification Search
CPC ......... G06N 3/00–20/00; G06F 1/00–2123/00; G06Q 10/00–50/00
USPC .............................................. 705/7.11–7.42
See application file for complete search history.

(56) References Cited

U.S. PATENT DOCUMENTS

| | | | | |
|---|---|---|---|---|
| 5,884,270 A * | 3/1999 | Walker | H04L 9/3271 | 379/93.12 |
| 8,527,510 B2 * | 9/2013 | Chen | G06Q 10/10 | 707/736 |
| 11,227,021 B2 * | 1/2022 | Efremov | G06F 16/9535 | |
| 2001/0042000 A1 * | 11/2001 | Defoor, Jr. | G06Q 10/10 | 705/7.14 |
| 2002/0002479 A1 * | 1/2002 | Almog | G06Q 10/10 | 705/7.29 |
| 2002/0010614 A1 * | 1/2002 | Arrowood | G06Q 10/06398 | 705/7.37 |
| 2002/0111843 A1 * | 8/2002 | Wellenstein | G09B 19/00 | 705/7.14 |
| 2006/0265266 A1 * | 11/2006 | Chen | G06Q 10/1053 | 705/321 |
| 2006/0265268 A1 * | 11/2006 | Hyder | G06Q 10/063112 | 705/321 |
| 2007/0273909 A1 * | 11/2007 | Chen | G06Q 30/08 | 358/3.22 |
| 2011/0010367 A1 * | 1/2011 | Jockish | G06Q 10/10 | 715/764 |
| 2012/0317045 A1 * | 12/2012 | Berg | G06F 16/951 | 707/706 |
| 2014/0244612 A1 * | 8/2014 | Bhasin | G06Q 50/01 | 707/706 |

(Continued)

OTHER PUBLICATIONS

Chia-An, Chao; Shih, Stephen C; "Organizational and End-User Information Systems Job Market: An Analysis of Job Types and Skill Requirements"; Information Technology, Learning, and Performance Journal 23.2: 1-15. Organizational Systems Research Association. (Fall 2005) (Year: 2005).*

*Primary Examiner* — Alan S Miller
(74) *Attorney, Agent, or Firm* — Buckley, Maschoff & Talwalkar LLC

(57) ABSTRACT

Pursuant to some embodiments, systems, methods, apparatus and computer program code are provided to provide substantially real-time recommendations to a user operating a user device to interact with job listing data.

17 Claims, 6 Drawing Sheets

(56) References Cited

U.S. PATENT DOCUMENTS

2015/0006286 A1\* 1/2015 Liu ................ G06Q 50/01
                                                                         705/14.53
2019/0251206 A1\* 8/2019 Su ................ G06F 16/9535
2019/0324765 A1\* 10/2019 Tsai ................ G06F 9/4484

\* cited by examiner

REAL-TIME RECOMMENDATION SYSTEMS AND METHODS

BACKGROUND

Job seekers commonly use the Internet to find employment opportunities. Often, these job seekers interact with job listing services to find positions of interest. Job listing services commonly use transactional and profile data to provide job recommendations that may be of interest to each job seeker. For example, artificial intelligence and machine learning techniques may be used to build a profile for each job seeker (sometimes referred to as a "single customer view"). A "single customer view" (also known as a propensity model), is an aggregated, consistent and holistic representation of the data held by an organization about its customers that can be viewed in one place, such as a single page.

The single customer view for a job seeker uses transaction and clickstream data associated with searches made by the job seeker as a training set for modeling. It may take hours to update the single customer view as new data is collected and as the model is trained. It may take additional time to generate any associated recommendation models for that job seeker. Unfortunately, this means that the recommendations that are currently being displayed to the job seeker (e.g., on a display screen of his or her mobile device or computer) are based on outdated behavior and transaction data.

As a result, recommendations made by the model may not match the job seeker's current intent. For example, many blue collar, temporary, or hourly workers may change or refine their job search intentions while interacting with a job listing service or even while browsing specific listings. Accordingly, what is needed is an improved mechanism for minimizing the time between a user's expression of intent or behavior and when that intent or behavior is reflected in job recommendation results.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1A:
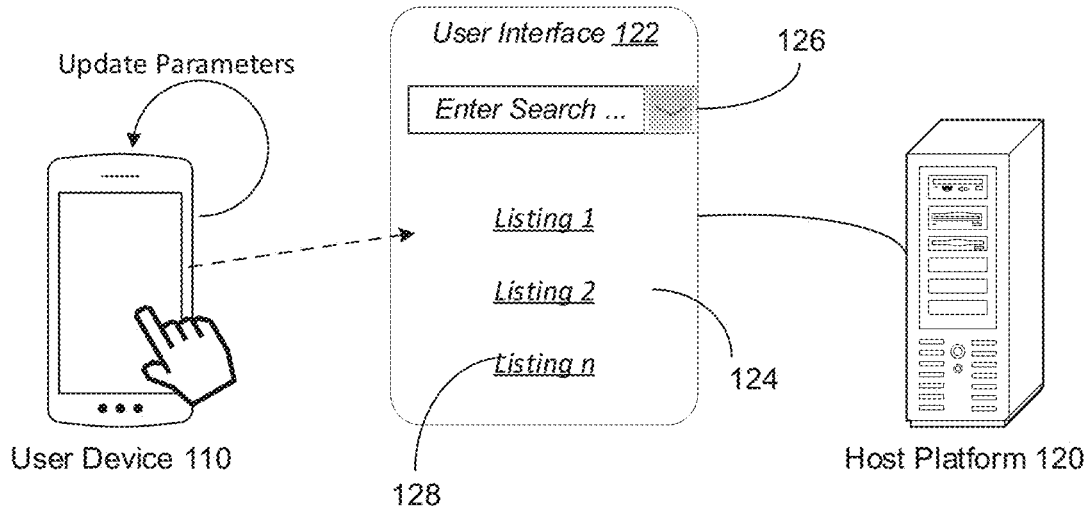
FIGS. 1A and 1B are diagrams illustrating a system for providing real-time recommendations in accordance with some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art upon reading this description, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown but is to be accorded the widest scope consistent with the principles and features disclosed herein.

One example area in which the Internet has been a great success is the job search and job posting area. Many job seekers use the Internet to find new employment opportunities. As described above, unfortunately, in some situations, job recommendation engines often reflect old information associated with the job seeker's intent. Embodiments described herein overcome these drawbacks by providing recommendations substantially in real time to reflect the job seeker's current intent.

Pursuant to some embodiments, systems, methods, apparatus and computer program code are provided to provide substantially real-time recommendations to a user operating a user device to interact with job listing data. Pursuant to some embodiments, the user device is operated to monitor the user's interactions with a first set of job listing data to generate at least a first interaction event. Weight metrics of attributes of a specific job listing associated with the at least first interaction event are calculated and stored on the user device. The weight metrics are transmitted to a recommendation engine for use by the recommendation engine in retrieving an updated set of job listing data containing job listings responsive to the weight metrics. The updated set of job listing data is then presented to the user. The process repeats as further interaction events are captured and weighted and used to obtain further updated sets of job listing data.

Pursuant to some embodiments, the interaction events may be pageviews, profile edits, or page scrolls. Other types of interaction events may also be utilized, some of which may depend on the form factor of the device used. For example, in embodiments where a user interacts with the job listing data using a computer having a mouse or other pointer device, interaction events based on pointer device (such as a mouse) may be captured. In some embodiments, the interaction events may be stored or grouped in temporal groupings. In some embodiments, the attributes may include event parameters associated with the interaction events, where the event parameters could include a timestamp, a job category, a job functional area, an industry type, a scroll height, a minimum salary, a maximum salary, a minimum experience level, a maximum experience level, and a location. These parameters are weighted and transmitted to the recommendation engine for use by the engine in retrieving job listing data that matches the user's current intentions.

FIG. 1 illustrates a system for providing real-time recommendations to users in accordance with an example embodiment. As shown in FIG. 1A, a host platform 120 generates job listing search results 124 that a user operating a user device 110 is likely to be interested in. The search results may be presented in response to a user entering one or more search terms in a search box 126 of the user interface. Those skilled in the art, upon reading the present disclosure will appreciate that other search interfaces may also be used to allow a user interacting with the user device 110 to specify one or more search terms or otherwise navigate the listings. The host platform 120 may aggregate job listing data from a number of third-party websites and job listing services or it may provide job listing data from listings associated with a particular service. The host platform 120 may include a web server, a cloud platform, a database, and the like. A user may view the listing data by operating a user device 110 to view a user interface 122 displaying the listing results 124. The user may interact with the listing results 124 in a number of ways. For example, the user may select one or more listing results to view details of a specific listing. The user may also scroll through listings. Each of these interactions may be generally referred to herein as "click-stream events" and data associated with these events may be referred to herein as "click-stream data".

A number of types of click-stream events and associated data may be collected and used pursuant to some embodiments. For example, in some embodiments, the following event_types are used: pageview, profile-edited, and page-scrolled. The pageview event type is identified when the user interacts with the user device 110 and clicks on a specific job listing to view details of that listing. The pageview event_type may be used to infer that the user was interested in that specific listing. The page-scrolled event_type may be used to infer how interested the user was in a specific listing. For example, if the user clicked on a listing (which fires a pageview event_type) and looked at the listing but did not scroll, then the user may not have been as interested in the listing as in a listing in which the user scrolled all the way through. Further, a user who takes the time to update his or her profile to indicate an interest in a specific job category likely has a high degree of current interest in that category. Embodiments track an event_type identifying when a user edits their profile (referred to herein as a "profile-edited" event type).

Each of the click-stream events may also include a timestamp as well as one or more parameters (referred to herein as "event_params") associated with the event. The event_params may be expressed as key-value pairs of attributes related to the event_type. For example, the page_scrolled event_type may have parameters such as job listing categories associated with the specific listing the user was viewing when the page was scrolled. Other parameters may include information identifying the scroll_height (e.g., expressed in pixels or the like, and indicating how far or deep the user scrolled on the listing), the previous scroll height (indicting whether the user previously scrolled, and if so, how deep, again expressed in pixels or the like). Different click-stream event types may have different parameters associated with them, but in general, each event type has an associated timestamp and one or more listing categories. The listing categories, in some embodiments, may be provided in one or more layers. For example, in one specific embodiment, the listing categories are provided in three layers or sub-categories: a first layer (referred to herein as "L1") identifying a top-level job category (e.g., such as sales, marketing, telephone sales, etc.), a second layer (referred to herein as "L2") identifying a functional area of the listing (e.g., such as field sales, inside sales, etc.), and a third layer (referred to herein as "L3") identifying an industry type associated with the listing (e.g., such as real estate, direct response marketing, etc.).

Pursuant to some embodiments, as the user interacts with the listing results 124, click-stream data is collected and then used to cause one or more parameters associated with the user to be updated and stored on the user device 110. These parameters are used, as will be described in more detail herein, to request updated listing results 124 from the host platform 120.

The user interface 122 of the user device 110 may be associated with an application running on the user device 110 or it may be associated with a Web browser running on the user device 110. The one or more parameters associated with the user may be stored in local memory of the user device 110. For example, in some embodiments, where the user interface 122 is associated with a Web browser, the local memory of the user device 110 may be local-storage associated with the Web browser. As another example, in some embodiments, where the user interface 122 is associated with an application running on the user device 110, the local memory may be the LevelDB open-source on-disk key-value store database. Those skilled in the art, upon reading the present disclosure, will appreciate that other local storage approaches may be used to implement features of the present invention so long as the click-stream data collected may be used to update parameters as described further herein. Pursuant to some embodiments, the user device 110 may be a computing device having a display, such as, for example, a mobile phone, a laptop, a tablet computer, a desktop computer, or the like.

According to various aspects, in step 100A shown in FIG. 1A, a user device 110 may generate a request (e.g., HTTP, etc.) while visiting a job listing website or application (displayed in a browser or other user interface 122) hosted by the host platform 120. The request may include a search/query request for information associated with job listings that may be submitted through a search bar 126, or otherwise requested by a user operating the user device 110. For example, the user may generate a request by selecting a button or link on the website or clicking on an ad that takes the user to the website. As another example, the host platform 120 may provide a set of job listings to the user device 110 without the need for requests to be entered. For example, a user of the user device 110 may enroll and request that new listings be transmitted to the user device 110 (e.g., through email, SMS or other messaging). As another example, the user may establish an account with the host platform 120 and provide some information indicating the types of job listings he or she is interested in receiving information about, and when the user logs into a website provided by the host platform 120, the listings may automatically be provided based on that information.

Figure 1B:
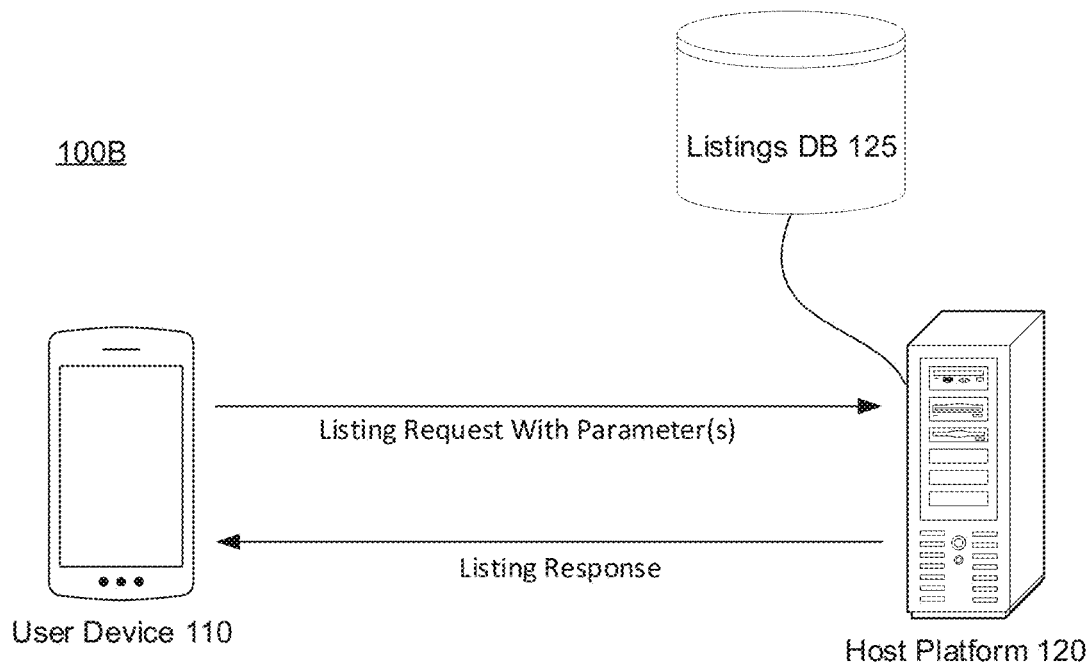

Referring now to FIG. 1B, in step 100B, the user device 110 may transmit a job listing request with one or more parameters to the host platform 120. The listing request may be triggered by an action by the user or it may be automatically transmitted by the user device 110 (or, more likely, by an application operating on the user device 110 or in a web browser of the user device 110). For example, in some embodiments, the listing request may be issued once an application operating on the user device 110 determines that it has sufficient information about the user's interest to transmit new parameters to the host platform 120 in order to obtain new job listings that match those parameters. Pursuant to some embodiments, the parameters that are sent are one or more weight-metrics which are calculated based on click-stream events associated with a user as discussed in more detail further below. In general, the weight-metrics are selected and generated to provide an indication of which job categories, locations, and listings are of current interest to the user in order to retrieve additional listings that satisfy the user's current interest.

In some embodiments, the parameters are transmitted to the host platform 120 as URL parameters appended to a URL associated with an application programming interface ("API") of a recommendation engine associated with the host platform 120. In some embodiments, the parameters may be HTTP posted to an API endpoint, for example. Upon receipt of the request and the parameters, the recommendation engine associated with the host platform 120 performs one or more queries of the listings database 125 to identify one or more job listings that match the parameters. The job listing data is then passed back to the user device 110 in one or more listing responses that are then rendered in a user interface for display to the user operating the user device 110. The user may then interact with the new job listings as described above (and the user device 110 is operated to collect further click-stream events associated with the user's interaction with those listings). The processes of FIGS. 1A and 1B may continue, ensuring that as the user's interest and intentions change, that new job listings that match those interests and intentions are obtained from the job listings database 125.

The result is a recommendation engine that is dynamic and that reacts to a user's interests substantially in real time without needing to wait for a machine learning model or recommendation engine to update. Unlike prior systems, embodiments perform the analyses required to obtain the real time data on the user device using click-stream data. The weight-metrics are calculated and stored on the user device, reducing data storage and processing costs otherwise incurred by the host system. Additional embodiments do not store the entire set of click-stream events. Instead, only counts or aggregated values are stored, further reducing storage requirements. Embodiments provide higher quality recommendations as they more closely match the user's current intentions and interest. Pursuant to some embodiments, the customer data and metrics are stored on the user device directly in the format which is required for querying the recommendation engine, resulting in substantial reduction of processing resources. Further, pursuant to some embodiments, weights are calculated on the user device rather on a remote device. This allows the weight metrics to be sent directly to the host platform 120 for querying available job listings, allowing the host platform 120 to return job listings that closely match the user's current intent.

Figure 2:
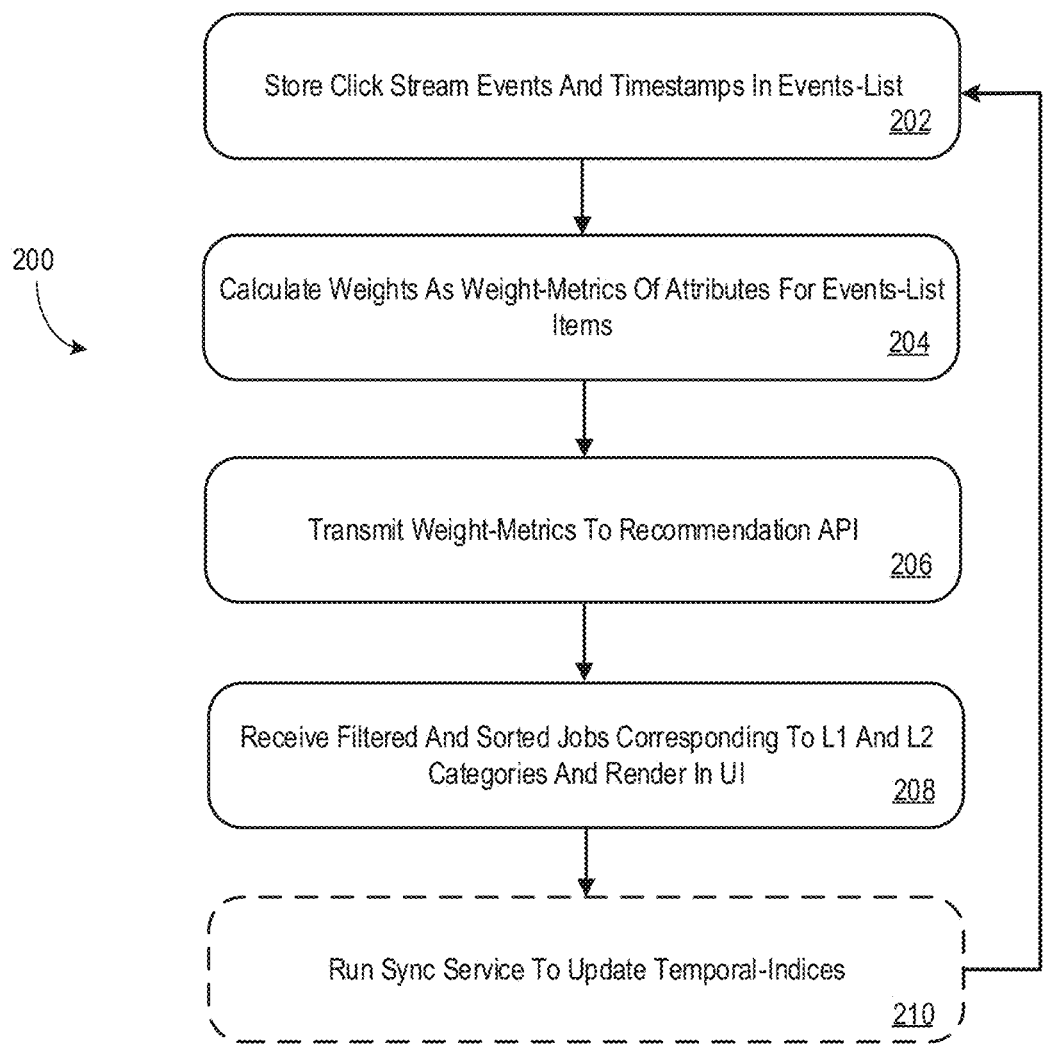
FIG. 2 is a flow diagram illustrating a process for operating a user device to obtain real-time recommendations in accordance with some embodiments.

Further details of features of some embodiments will now be described by referring to several flow diagrams that describe processes that may be performed by an application performed by a computing device or a group of computing devices, such as a user device, a web server, a host platform, a cloud computing environment, and the like to implement features of the present invention. Referring to FIG. 2, a process 200 for operating a user device to obtain real-time recommendations is shown. The process 200 may be performed by a user device, such as the user device 110 of FIG. 1 interacting with a recommendation engine hosted at, for example, a host platform such as host platform 120 of FIG. 1. In general, the process 200 may begin after a user operating a user device 110 logs in to a website or an application associated with the job listing service. Process 200 begins at 202 where click-stream events and related data (including timestamps) are stored in an events-list in local storage on the user device 110. As described above, embodiments collect and then use information about user actions or "events" when interacting with job listing data to discern the user's current interest in different jobs. Processing at 202 includes capturing such event data and storing it in a way that allows the data to be used in retrieving new listings. Pursuant to some embodiments, the event data is stored in an events-list which is an array of event objects. Each event-object has a number of attributes including, for example, an event_type, a timestamp, and one or more event_params. A sample illustrative event-object may be formed as follows:

```
{
    event_type: 'page_scrolled',
    timestamp: 1550129639,
    event_params: {
        L1_category: 3,
        L2_category: 250,
        previous_scroll_height: 0,
        scroll_height: 100
    }
}
```

In the illustrative event-object shown above, one specific event_type is shown with a timestamp (of the time when the event occurred) as well as several event_params associated with the event. In particular, two listing categories are identified by a numerical identifier (which may be used, for example, by the recommendation engine of the host platform 120 to retrieve relevant listings associated with those categories), as well as information relevant to the event_type of "page_scrolled" (i.e., information associated with the depth of scroll that the user performed for this listing). In the illustrative example, the user previously did not scroll, but in this current listing the user scrolled to a depth of 100 pixels (suggesting that the user has some level of interest in that specific listing, although may be less interest than in a listing where the user scrolled to a depth of 300 pixels, for example). Processing at step 202 continues as event data is captured as the user continues to interact with different job listings.

Processing continues at 204 where the application performs calculations to determine relative weights as weight-metrics of attributes for each item in the events-list. Pursuant to some embodiments, the weight-metrics are an indexed list of hierarchical objects storing weights of predefined parameters associated with the events data collected in 202. The weights can be calculated using a statistical model or using machine learning techniques. In some embodiments, the weights are calculated using a probability function. An illustrative example of such a hierarchical object is shown below:

```
{
    ... ...
    ... ...
    L1_category_3: {
        net_weight: 124,
        L2_category_250: {
            net_weight: 34,
            adpv_weight: 10,
            page_scrolled_weight: 8,
            ad_applied_weight: 16,
            min_salary_avg: 8000,
            max_salary_avg: 22000,
```

-continued

```
            min_experience: 2yrs,
            max_experience: 6yrs,
            locations: [
                {id: 22, name: delhi, weight: 12},
                {id: 24, name: gurugram, weight: 3}
            ]
        },
        L2_category_256: {
            net_weight: 90,
            adpv_weight: 30,
            page_scrolled_weight: 20,
            ad_applied_weight: 40,
            min_salary_avg: 10000,
            max_salary_avg: 21000,
            min_experience: 2.5yrs,
            max_experience: 8yrs,
            locations: [
                {id: 22, name: delhi, weight: 6},
                {id: 27, name; Noida, weight: 10}
            ]
        },
    }
    ....
    ....
}
```

In the above illustrative example, the term "adpv" refers to an ad-detail page view. For example, an adpv may be indicated if the user clicks on a job listing to see details of that job listing (e.g., to view the detail page associated with the job). An example of a detail page associated with a job is shown below in conjunction with FIGS. 5 and 6. In the above illustrative example, two different "L2" categories in an "L1" category are weighted. As discussed above, the "L1" category may be, for example, an overall job category, and an "L2" category may be, for example, the functional area within that overall job category.

In this example, the user has shown some level of interest in job listings in the job category identified as "L1_category_3" and more particularly in jobs in two functional areas of that job category (the functional areas identified as "L2_category_250" and "L2_category_256"). Each of the "L2" category objects include a number of attributes about the specific jobs within those functional area categories that the user showed some interest in, as well as weighting data providing an indication of how interested (or not interested) the user was in each specific functional area category. In the illustrative example shown above, the user was relatively more interested in the job in functional area category 256 and was more interested in the position in Noida.

For illustrative purposes, a specific weight calculation example will now be provided. In the example, an application configured pursuant to the present invention serves to offer job listings in five categories and sub-categories. The two categories are Sales and Marketing (category L11) and Business Process Outsourcing ("BPO", category L12). The Sales and Marketing category has three sub-categories: Direct-Sales (L21), Online-Sales (L22), and Tele-Sales (L23). The BPO category has two subcategories: Customer-Support (L21) and Technical-Support (L22). For notational purposes, the category/sub-category pair of BPO—Technical-Support is referred to as "L12_L22"). In this illustrative example, a job seeker operating a user device 110 can interact with job listings in two ways. First, the user can navigate to a job detail page to view the details of a specific job listing ("event 1" or "E1"). Next, the user can apply to a specific job listing ("event 2" or "E2"). Some embodiments calculate the weight of each category based on the recency of each of these actions, using a formula such as Formula 1 shown below:

$$W_{Cat_j} = \sum_{e_i \in Cat_j} \frac{w_{e_i}}{\text{age}(e_i)} \quad \text{Formula 1}$$

$$\text{age}(e_i) = 1 + \min\left(\text{now} - \text{day}(e_i),\ 1 + \frac{\text{now} - \text{day}(e_i)}{7},\ 2\right) \quad \text{Formula 2}$$

In the illustrative formulas, the variable "now" is the current date, day($e_i$) is the date on which the event ($e_i$) occurred, and ($e_i$) is the event that occurred (as a result of some user behavior, such as, for example, viewing details of a specific job listing—"e1" or applying to a specific job listing—"e2"). In the illustrative example, the weight of "e1" is "6" and the weight of "e2" is "12" (that is, an applicant actually applying to a job listing is more indicative of intent than simply viewing details of a listing). At the start of the illustrative example, the weights of each category is set to "0" (e.g. the weights are set as: W=[L11_L21=0, L11_L22=0, L11_L23=0, L12_L21=0, L12_L22=0]). Pursuant to some embodiments, instead of calculating the weight of every category, only relevant category weights are updated. For example, take the following scenario:

First, the user goes to a job-detail page for Sales and Marketing/Online-Sales (L11_L22). The weights are updated as: W=[0, 6, 0, 0, 0] and

```
E=[
    { },
    { today: 6},
    { },
    { },
    { }
].
```

Next, on the same day, the user visits another job-detail page (this time for BPO/Technical-Support(L12_L22)). The weights are updated as: W=[0, 6, 0, 0, 6] and

```
E=[
    { },
    { today: 6},
    { },
    { },
    { today: 6}
].
```

Next, on the same day, the user visits another job-detail page (this time for another Sales and Marketing/Online-Sales(L11_L22)). The weights are updated as: W=[0, 12, 0, 0, 6] and

```
E=[
    { },
    { today: 12},
    { },
    { },
    { today: 6}
].
```

Next, on the same day, the user visits another job-detail page (yet another Sales and Marketing/Online-Sales (L11_L22) listing). The weights are updated as W=[0, 18, 0, 0, 6] and

```
E=[
    { },
    { today: 18},
    { },
    { },
    { today: 6},
].
```

On the same day the user applies to a job (in the category of Sales and Marketing/Online-Sales(L11_L22)). The weights are updated as W=[0, 30, 0, 0, 6] and

```
E=[
    { },
    { today: 30},
    { },
    { },
    { today: 6},
].
```

At the end of the day, a sync service is run to update the temporal data for the event data, causing the event data to update as follows

```
E=[
    { },
    { today: 0, this_week: 30},
    { },
    { },
    { today: 0, this_week: 6},
],
``` and the weight data to be updated to: W=[0, 15, 0, 0, 3] (as the weights are now spread over two days instead of one).

On the second day, the user visits another job-detail page this time for category BPO/Customer-Support(L12_L21). The weights are updated as W=[0, 15, 0, 6, 3] and

```
E=[
    { },
    { today: 0, this_week: 30},
    { },
    { today: 6},
    { today: 0, this_week: 6},
].
```

On the second day, the user visits another job-detail page (again for BPO/Customer-Support (L12_L22)). The weights are updated as W=[0, 15, 0, 6, 9] and

```
E=[
    { },
    { today: 0, this_week: 30},
    { },
    { today: 6},
    { today: 6, this_week: 6},
].
```

At the end of the second day, the sync service is again run causing the following values for the event data and weights:

```
E=[
    { },
    { today: 0, this_week: 0, past: 30},
    { },
    { today: 0, this_week: 6},
    { today: 0, this_week: 6, past: 6},
], and W=[0, 10, 0, 3, 5],
```

Using this strategy, we have weights of each category at any point of time, and it requires O(1)space as well O(1) time-complexity. These weights are sent to the API, which in return responds with a list of recommended jobs based on the ratio of weights for each L1_L2 category. Along with the weight details, in some embodiments, other data may be sent, such as, for example, min_salary_avg, max_salary_avg, min_experience, max_experience. These data elements may be transmitted to the API in the request parameters of the AP and result in more filtered and targeted results for the user. In some embodiments, location_weights may also be calculated for each category.

As an example, following are recommendation API request parameters that may be transmitted:

```
{'L11_L22':{weight:10,
        min_salary_avg:10000 INR,
        Max_salary_avg:25000 INR,
        Min_experienced:2 Y, // min of min_experience
        max_experience:5Y, // max of max_experience
        Locations_weights:{Delhi:6, Gurgaon:9}
        },
    'L12_L21':{weight:3,
        min_salary_avg:8000 INR,
        Max_salary_avg:18000 INR,
        Min_experienced:2 Y, // min of min_experience
        max_experience:4Y, // max of max_experience
        Locations_weights: {Noida:3, Gurgaon:6}
        }
    'L12_L22':{weight:5,
        min_salary_avg:13000 INR,
        Max_salary_avg:27000 INR,
        Min_experienced:4 Y, // min of min_experience
        max_experience:7Y, // max of max_experience
        Locations_weights: {Delhi:6, Noida:9}
        }
}
```

Pursuant to some embodiments, the API, in response to the request with the parameters described above, will return the recommended jobs listing details with respect to the ratio of all the weights in the API request parameters. For example, the Category Weight=[10,3,5] and the ratio for each category may be =[10/18, 3/18/5/18]=>[0.55, 0.17, 0.28]. In response to a request containing these category weights and ratios, the API will cause the system to search for jobs from each category with the specified ratio and further filtered by any parameters provided (e.g., such as min_salary_avg, max_salary_avg, min_experience, max_experience). Further, the location ratio may be used to consider location preferences with respect to the locations weight calculations.

Pursuant to some embodiments, an accumulator pattern is followed in the computation of the weight-metrics. For example, prior to computing the weight-metrics, each weight-metric is initialized to a known value. Then, as new events are identified and pushed into the event-list, the associated event's weight-metric is updated considering only that specific event. Finally, a sync service is run (as described further below) which functions to update the weight-metrics considering only those events that change their temporal groups. For example, if a temporal group includes only events from the last seven days, when the sync service runs, it will only consider events for a weight-metric that occurred within the last seven days. Such an approach provides desirable results, particularly in embodiments where the user device 110 is a mobile device given that mobile devices and browsers have limitations and constraints in terms of computing resources.

The calculations of the weight metrics are performed for all the events in the events-list and processing then continues at 206 where the weight-metrics are transmitted from the user device 110 to the recommendation API associated with the host platform 120. In some embodiments, the weight-metrics are transmitted as URL parameters to a recommendation API endpoint (e.g., which may be configured to receive the parameters via an HTTP/HTTPS GET or POST). The URL parameters may include information identifying the user device 110 as well as parameters identifying the weight-metrics for each category (and/or for other attributes which may be weighted pursuant to embodiments of the present invention to provide an indication of a user's relative interest in specific listings or areas). In some embodiments, a typical call to the recommendation API may include weight-metrics associated with L1 and L2 categories along with other weight-metrics for salary range, experience required, preferred location, etc. The API uses each of these received weight-metrics to query listing databases and to filter the results ensuring the user is presented with listing data that most closely matches the user's current intent.

Processing continues at 208, where the application receives filtered and sorted job data corresponding to the categories of interest and renders the job data in a user interface for display to the user operating the user device 110. For example, after receiving the parameters (at 206), the host platform 120 may perform queries to identify one or more job listings that most closely match the weighted parameters collected on the user device 110 based on the user's click-stream activity. Pursuant to some embodiments, the host platform 120 uses the parameters to query a database such as the listings database 125 of FIG. 1B to obtain relevant listing data. In some embodiments, the host platform 120 performs some sorting or ranking of the retrieved listing data to present the listing data to the user device 110 in a form that represents the most relevant data first. The application of the user device 110 (or in a browser of the user device 110) is then operated to cause the retrieved listing data to be rendered in a user interface for display to the user.

Processing at 202-208 repeats as needed, e.g., as the user continues to interact with the user interface and interact with different job listings and create different click-stream event data. Periodically (or on a set schedule or time frame), processing at 210 occurs to run a sync service to update temporal-indices. Pursuant to some embodiments, the sync service is an application service associated with the application running on the user device 110 (or running in a browser of the user device 110). The sync service updates temporal groups and removes old event data such that the size of data does not exceed predetermined limits. Because embodiments are designed to reflect recent or current usage by the user, older event data may be removed by the sync service, ensuring the application operates quickly and does not impose a storage drain on the user device 110. Pursuant to some embodiments, event data may be grouped based on time windows (e.g., based on the timestamp of each event). For example, time window groups may be formed for event data from the last seven days, the last two weeks, or the like. By grouping event data into such time windows or temporal groups, embodiments allow the sync service to easily update or delete appropriate groups. Because embodiments are typically more concerned with recent event data, such groupings allow older data to easily be removed, ensuring storage space is preserved.

Figure 3:
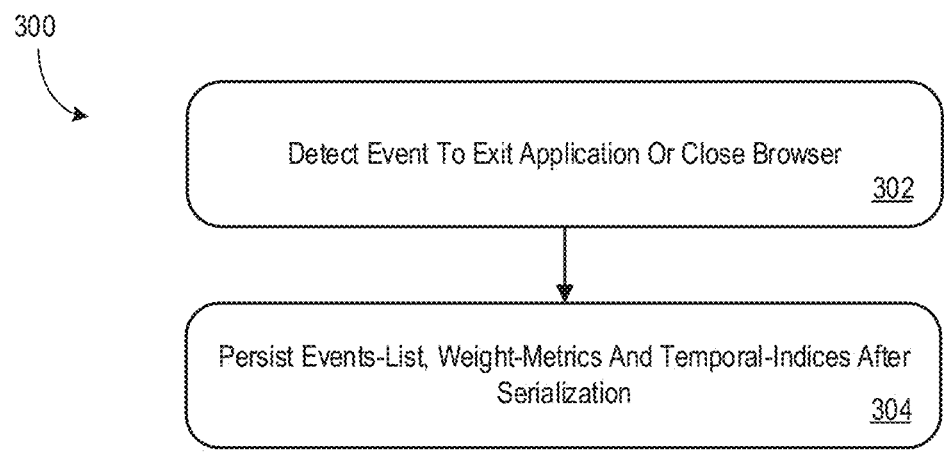
FIG. 3 is a flow diagram illustrating a process for persisting information on a user device pursuant to some embodiments.

Referring now to FIG. 3, a process 300 for persisting information on a user device pursuant to some embodiments is shown. The process 300 may be performed by a user device, such as the user device 110 of FIG. 1 during an interaction with a recommendation engine hosted at, for example, a host platform such as host platform 120 of FIG. 1. The process 300 may start at, for example, 302 where the application operating on the user device 110 (or through a browser of user device 110) detects an event to exit the application (or close the browser). The processing step at 302 may continually search for such an event and may monitor the application (or browser) in the background until such an event is detected. Once such an event is detected, processing continues at 304 where the user device 110 is operated to persist the events-list, weight-metrics and the temporal-indices after serialization onto a persistent storage service associated with the platform. In some embodiments, the storage service is local storage for web browser applications and LevelDB for mobile applications. Pursuant to some embodiments, by storing data on the user device 110 (and only the data that is needed to perform weight calculations as described herein), processing time and storage requirements are greatly reduced resulting in improved performance and cost efficiency.

Figure 4:
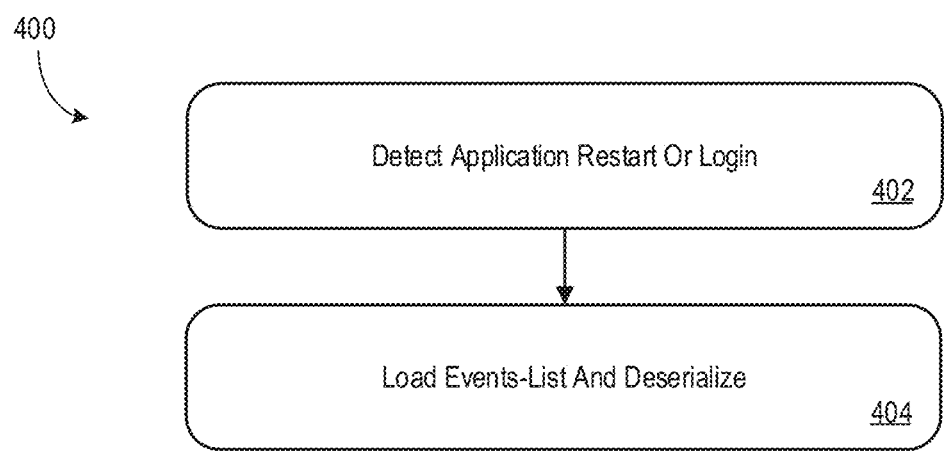
FIG. 4 is a flow diagram illustrating a process for initializing a user device pursuant to some embodiments.

Referring now to FIG. 4, a process 400 for initializing a user device pursuant to some embodiments is shown. The process 400 may be performed by a user device, such as the user device 110 of FIG. 1 when a user operates the device to initiate an interaction with a recommendation engine hosted at, for example, a host platform such as host platform 120 of FIG. 1. The process 400 may start at, for example, 402 where the application operating on the user device 110 (or through a browser of user device 110) detects an event start an interaction with the recommendation engine (e.g., when the application is opened or when a browser is directed to a URL associated with the recommendation engine). Once such an event is detected, processing continues at 404 where the user device 110 is operated to load the events-list (which was previously stored in persistent storage on user device 110 as described elsewhere herein) and deserialize the events-list. This prepares the application for use and reflects the user's intent as of the last time the application was used for searching and interacting with job listings. Processing then continues as normal (following the steps shown in FIG. 2, for example).

Figure 5:
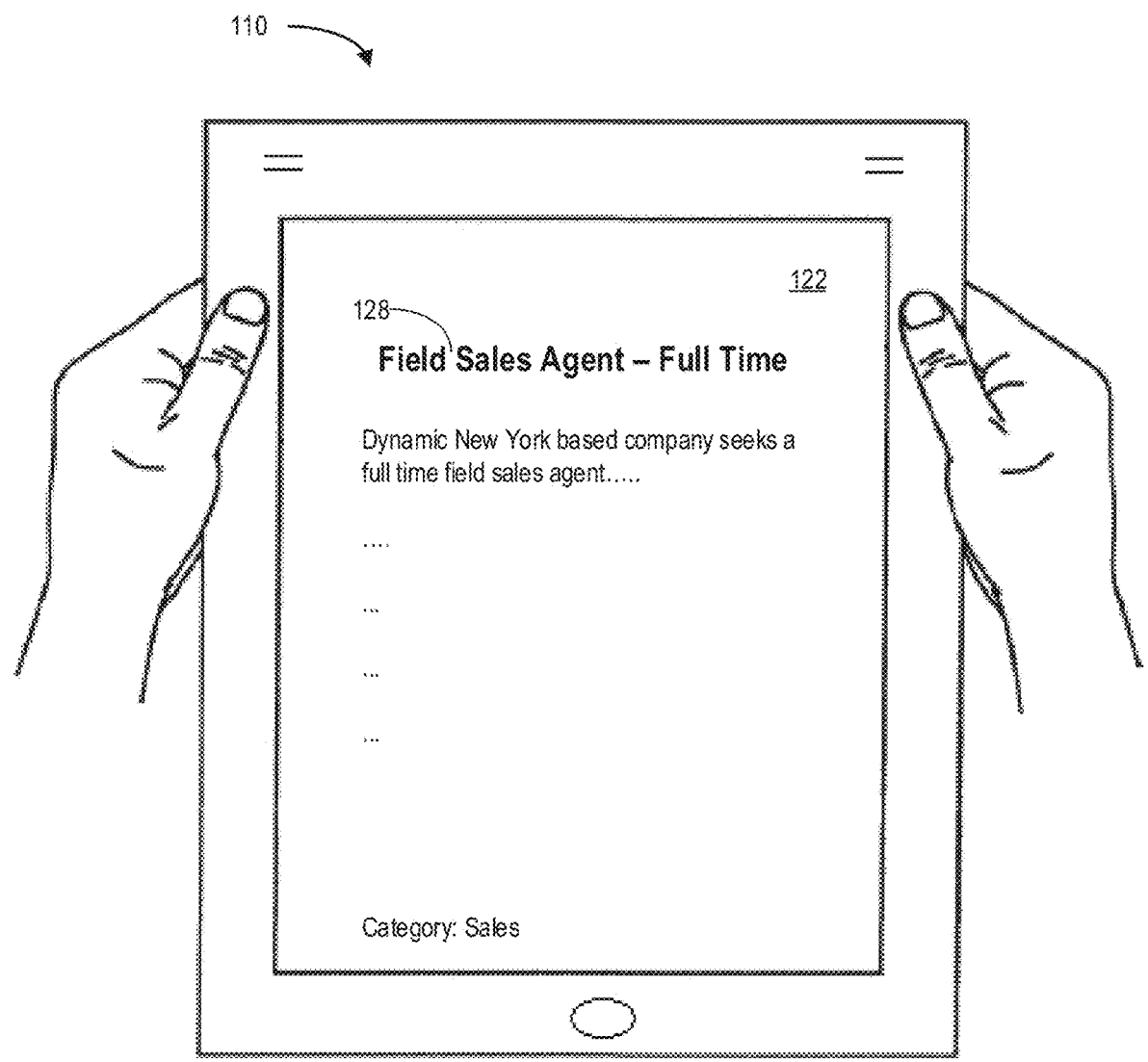
FIGS. 5 and 6 are examples of job listing displays pursuant to some embodiments.
Figure 6:
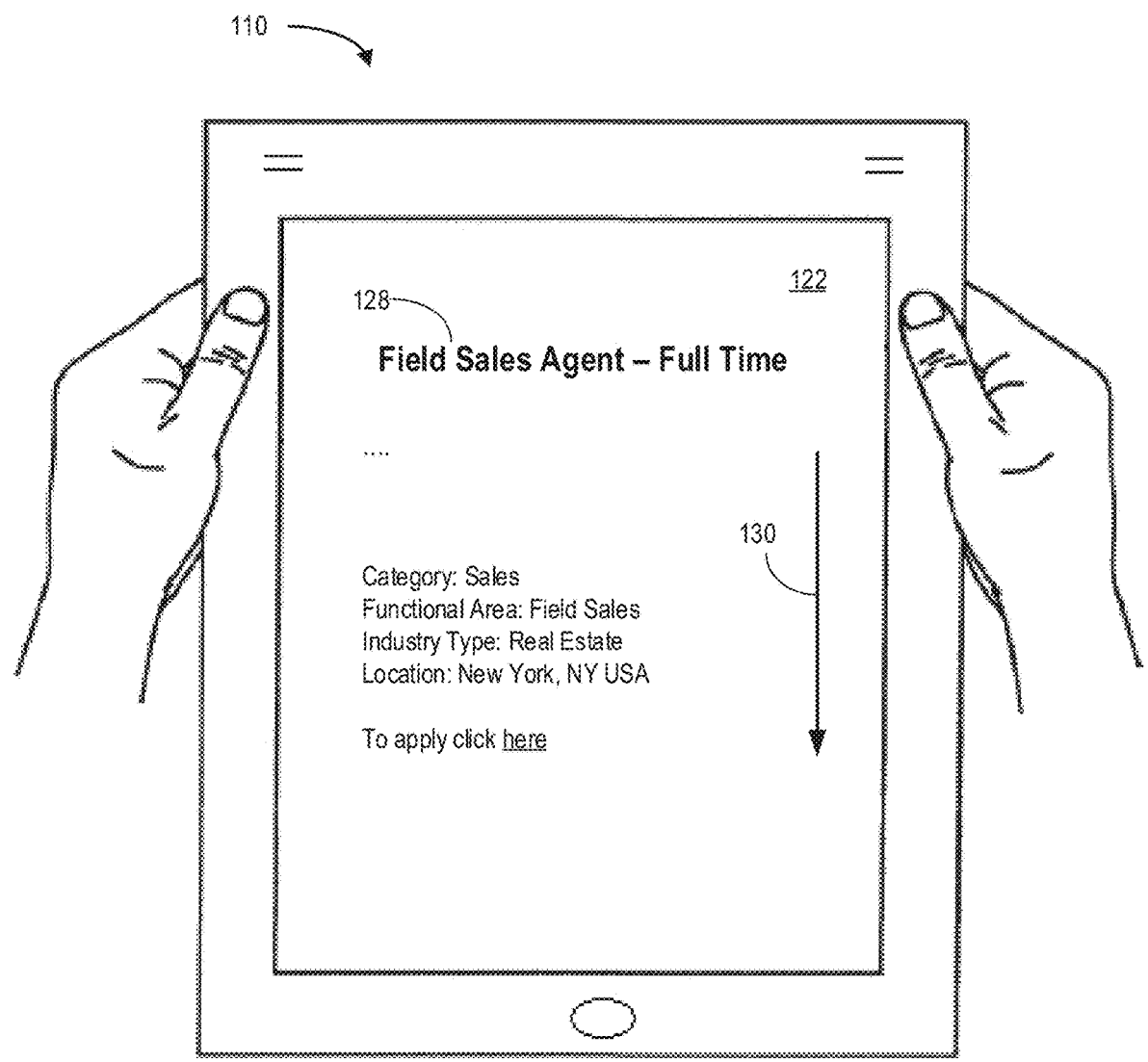

FIG. 5 illustrates an example of a user interface 122 of a user device 110. The user interface 122 of FIG. 5 depicts a single page display view of a job listing 128. The user may navigate to the view by clicking on the specific listing from a page showing a number of such listings. Pursuant to some embodiments, an event is recorded when the user clicks on the title of the listing to navigate to the single page display view of the listing to see the listing details. Further, once the user navigates to the single page display view other events may be recorded. For example, referring to FIG. 6, if the user navigates through the listing (e.g., by scrolling down in the page as represented by item 130), a further event may be recorded that indicates how deep or far the user navigated. In some embodiments, this may be recorded as a count of pixels down the page that the user navigated (although other metrics or measures may also be used). The event data may be recorded, for example, using Javascript or the like.

Embodiments described herein may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 7:
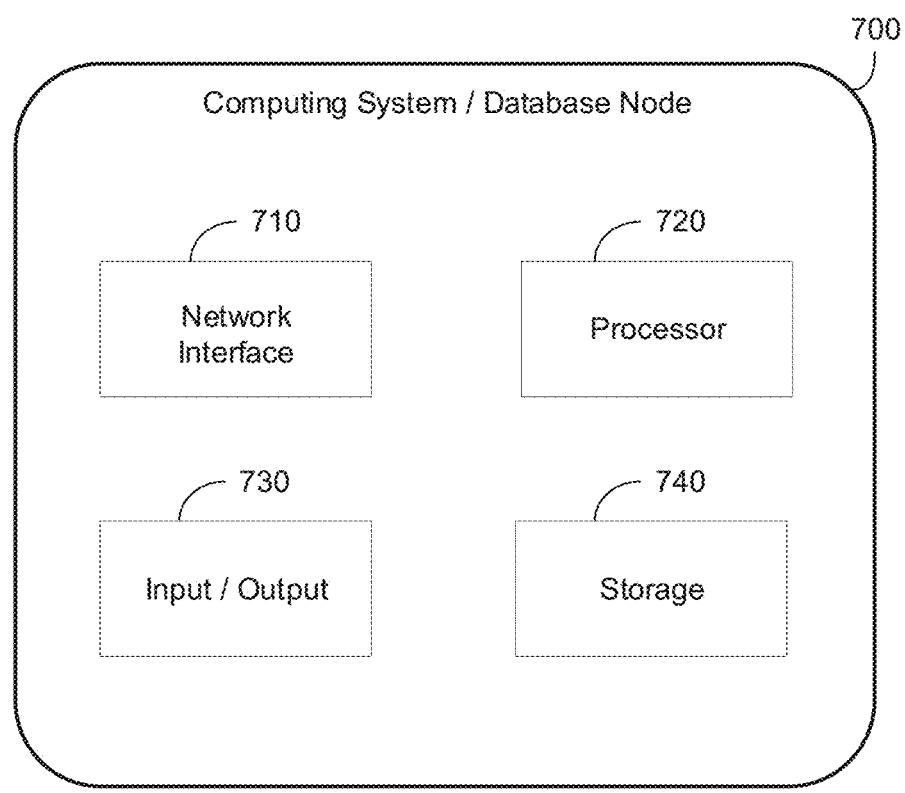
FIG. 7 is a diagram illustrating a computing system for use in the example embodiments described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 7 illustrates an example computing system 700 which may represent or be integrated in any of the above-described components, etc. FIG. 7 is not intended to suggest any limitation as to the scope of use or functionality of embodiments described herein. The computing system 700 is capable of being implemented and/or performing any of the functionality set forth hereinabove.

The computing system 700 may include a computer system/server, which is operational with numerous other general-purpose or special purpose computing system environments or configurations. Examples of well-known computing systems, environments, and/or configurations that may be suitable for use as computing system 700 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like.

The computing system 700 may be described in the general context of computer system-executable instructions, such as program modules, being executed by a computer system. Generally, program modules may include routines, programs, objects, components, logic, data structures, and so on that perform particular tasks or implement particular abstract data types. The computing system 700 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 7, the computing system 700 is shown in the form of a general-purpose computing device. The components of computing system 700 may include, but are not limited to, a network interface 710, one or more processors or processing units 720, an output 730 which may include a port, an interface, etc., or other hardware, for outputting a data signal to another device such as a display, a printer, etc., and a storage device 740 which may include a system memory, or the like. Although not shown, the computing system 700 may also include a system bus that couples various system components including system memory to the processor 720.

The storage device 740 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 740 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 740 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 700 may also communicate with one or more external devices such as a keyboard, a pointing device, a display, etc.; one or more devices that enable a user to interact with computer system/server; and/or any devices (e.g., network card, modem, etc.) that enable computing system 700 to communicate with one or more other computing devices. Such communication can occur via I/O interfaces. Further, computing system 700 can communicate with one or more networks such as a local area network (LAN), a general wide area network (WAN), and/or a public network (e.g., the Internet) via network interface 710. As depicted, network interface 710 may also include a network adapter that communicates with the other components of computing system 700 via a bus. Although not shown, other hardware and/or software components could be used in conjunction with the computing system 700. Examples include, but are not limited to: microcode, device drivers, redundant processing units, external disk drive arrays, RAID systems, tape drives, and data archival storage systems, etc.

Pursuant to some embodiments, the computing system 700 may be a user device (e.g., such as a mobile phone, tablet computer, personal computer or the like) operated to display listing data to a user and to monitor the user's interactions with the listing data as described herein in order to obtain updated listing data from a remote recommendation engine such that the updated listing data closely relates to the user's current intentions and interests.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A method for operating a user device, comprising:
   displaying a first set of job listing data;
   monitoring, by the user device, a user's interactions with at least a first job listing in the first set of job listing data and storing information identifying at least a first interaction event associated with the user's interaction with the at least first job listing, the at least first interaction event including at least a first clickstream event and a timestamp of the at least first clickstream event;
   calculating, by the user device, weight metrics of attributes of the at least first job listing associated with the at least first interaction event, the attributes including at least a job category of the at least first interaction event and the weight metrics representing a level of interest in the at least first job listing;
   updating an event data object on the user device by storing the weight metrics and the attributes on the user device;
   transmitting information associated with the event data object including the weight metrics and the attributes to a recommendation engine as query data to cause the recommendation engine to retrieve a second set of job listing data containing job listings that match the query data;
   receiving, by the user device, the second set of job listing data;
   presenting, by the user device, the second set of job listing data to the user.

2. The method of claim 1, wherein the at least first interaction event is one of: a pageview, a profile edit, a cursor movement and a page scroll.

3. The method of claim 1, further comprising:
   grouping the at least first interaction event in a temporal group of events in the event data object on the user device.

4. The method of claim 3, further comprising:
   detecting an event to exit one of an application or a browser displaying the job listing data; and
   persisting information associated with the at least first interaction event, the weight metrics and the temporal group in the event data object in a persistent storage of the user device.

5. The method of claim 1, further comprising:
   detecting an event to start one of an application or a browser to display the job listing data; and
   loading, from the event data object on the user device, an initial set of interaction events from a prior interaction by the user.

6. The method of claim 3, further comprising:
   initiating a sync service on the user device, the sync service causing the removal of the at least first interaction event from the temporal group of events if a timestamp associated with the at least first interaction event indicates the at least first interaction event is outside the temporal group.

7. The method of claim 1, wherein the attributes include at least a first event parameter associated with the at least first interaction event, the event parameter including at least one of: a timestamp, a job functional area, an industry type, a scroll height, a minimum salary, a maximum salary, a minimum experience level, a maximum experience level, and a location.

8. The method of claim 7, wherein the transmitting the weight metrics to a recommendation engine further comprises transmitting weight metrics for each of the event parameters as URL parameters to the recommendation engine.

9. The method of claim 1, wherein the user device is a mobile device operating an application configured to display job listing data.

10. A computing system, comprising:
    a network interface configured to receive job listing data from a remote recommendation engine; and
    a processor configured to
    display a first set of job listing data to a user;
    monitor a user's interactions with at least a first job listing in the first set of job listing data, and storing information identifying at least a first interaction event associated with the user's interaction with the at least first job listing, the at least first interaction event including at least a first clickstream event and a timestamp of the at least first clickstream event;
    calculate weight metrics of attributes of the at least first job listing associated with the at least first interaction event, the attributes including at least a job category of the at least first interaction event and the weight metrics representing a level of interest in the at least first job listing;

update an event data object on the computing system by storing the weight metrics and the attributes on the computing system;

transmit information associated with the event data object including the weight metrics and the attributes to the remote recommendation engine as query data to cause the recommendation engine to retrieve a second set of job listing data containing job listings that match the query data;

receive the second set of job listing data; and present the second set of job listing data to the user.

11. The computing system of claim 10, wherein the at least first interaction event is one of: a pageview, a profile edit, and a page scroll.

12. The computing system of claim 10, further comprising:

grouping the at least first interaction event in a temporal group of events in the event data object on the user device.

13. The computing system of claim 12, further comprising:

detecting an event to exit one of an application or a browser displaying the job listing data; and persisting information associated with the at least first interaction event, the weight metrics and the temporal group in the event data object in a persistent storage of the user device.

14. The computing system of claim 10, further comprising:

detecting an event to start one of an application or a browser to display the job listing data; and loading, from the event data object on the computing system, an initial set of interaction events from a prior interaction by the user.

15. The computing system of claim 12, further comprising:

initiating a sync service on the computing system, the sync service causing the removal of the at least first interaction event from the temporal group of events if a timestamp associated with the at least first interaction event indicates the at least first interaction event is outside the temporal group.

16. The computing system of claim 10, wherein the attributes include at least a first event parameter associated with the at least first interaction event, the event parameter including at least one of: a timestamp, a job functional area, an industry type, a scroll height, a minimum salary, a maximum salary, a minimum experience level, a maximum experience level, and a location.

17. The computing system of claim 16, wherein the transmitting the weight metrics to a recommendation engine further comprises transmitting weight metrics for each of the event parameters as URL parameters to the recommendation engine.

* * * * *